United States Patent
Rubin (10) Patent No.: US 7,912,213 B2
(45) Date of Patent: *Mar. 22, 2011

(54) DEVICE, SYSTEM AND METHOD FOR FAST SECURE MESSAGE ENCRYPTION WITHOUT KEY DISTRIBUTION

(76) Inventor: Frank Rubin, Wappingers Falls, NY (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/748,217

(22) Filed: May 14, 2007

(65) Prior Publication Data

US 2007/0297614 A1    Dec. 27, 2007

Related U.S. Application Data

(60) Provisional application No. 60/828,998, filed on Oct. 11, 2006.

(51) Int. Cl.
*H04L 9/00*    (2006.01)
(52) U.S. Cl. .......................... 380/28; 380/255
(58) Field of Classification Search ....... 380/28
See application file for complete search history.

(56) References Cited

U.S. PATENT DOCUMENTS

| | | | |
|---|---|---|---|
| 4,200,770 A | | 4/1980 | Hellman et al. |
| 4,567,600 A | * | 1/1986 | Massey et al. ........ 713/174 |
| 5,159,632 A | | 10/1992 | Crandall |
| 5,271,061 A | | 12/1993 | Crandall |
| 5,987,130 A | | 11/1999 | Chang |
| 6,212,279 B1 | | 4/2001 | Reiter et al. |
| 6,363,154 B1 | | 3/2002 | Peyravian et al. |
| 6,377,689 B1 | | 4/2002 | Vanstone et al. |

(Continued)

FOREIGN PATENT DOCUMENTS

WO    WO 03/007540 A1    1/2003

OTHER PUBLICATIONS

"Application to Cryptography." Dec. 14, 2003 from Internet Archive Wayback Machine. http://aix1.uottawa.ca/~jkhoury/cryptography.htm pp. 1-4.*
Maitra et al. Progress in Cryptology—Indocrypt 2005. 6th International Conference on Cryptology in India Proceedings. Springer. Dec. 2005, pp. 1-3.*
Menezes, A., Van Oorschot, P., and Vanstone, S., "Handbook of Applied Cryptography," CRC Press, 1996, p. 500.

(Continued)

*Primary Examiner* — Nasser Moazzami
*Assistant Examiner* — Lisa Lewis
(74) *Attorney, Agent, or Firm* — Jay R. Yablon (57) ABSTRACT

One party sends a securely encrypted message to a second party. Each party chooses a secret message key for the message, which is never shared with or transmitted to any other party. The message is sent by means of three encrypted messages. The first encrypted message is sent from the sender to the receiver, and is encrypted by the sender's key. The second encrypted message is sent from the receiver back to the sender, and is encrypted by both the sender's key and then by the receiver's key. The third encrypted message is sent from the sender back to the receiver, and is encrypted by only the receiver's key following removal of the sender's key. Finally, the receiver decrypts the third message. The messages are sent in blocks. Encryption consists of multiplying each block of the message by square matrices of the same size as the block, and decryption consists of multiplying by the inverse matrices. The key matrices are taken from one or more large commutative families of matrices. This commutativity allows the sender's keys to be removed even though the message block has been encrypted by the sender's key first and then the receiver's key. Two primary embodiments of the invention are disclosed, using one-sided and two-sided matrix multiplication, respectively.

24 Claims, 2 Drawing Sheets

U.S. PATENT DOCUMENTS

| | | | |
|---|---|---|---|
| 6,987,855 B1 | 1/2006 | Srivastava | |
| 6,993,136 B2 | 1/2006 | Solinas | |
| 7,020,282 B1 | 3/2006 | Chang | |
| 7,120,696 B1 | 10/2006 | Au et al. | |
| 7,149,308 B1 | 12/2006 | Fruehauf et al. | |
| 7,156,299 B1 | 1/2007 | Harris et al. | |
| 2007/0239409 A1* | 10/2007 | Alan | 703/2 |
| 2008/0310622 A1* | 12/2008 | Drehmel et al. | 380/29 |

OTHER PUBLICATIONS

Rubin, Frank, "Arithmetic Stream Coding Using Fixed Precision Registers," IEEE Trans. on Info. Theory 25 (Nov. 1979), pp. 672-675.

Rubin, Frank, "NK-CRYPT Message Encryption System," www.mastersoftware.biz/nkcrypt.htm.

www.bindhast.com/keylilla.htm.

\* cited by examiner

DEVICE, SYSTEM AND METHOD FOR FAST SECURE MESSAGE ENCRYPTION WITHOUT KEY DISTRIBUTION

CROSS-REFERENCE TO RELATED APPLICATIONS

This application claims benefit of pending provisional application U.S. 60/828,998 filed Oct. 11, 2006.

FIELD OF THE INVENTION

This invention relates to the field of cryptography, and in particular, to a device, system and method which allows secure encrypted transmission of messages without the need for the sender or receiver to transmit any common public or private encryption keys.

BACKGROUND OF THE INVENTION

Since 1800 the most widely-used methods for secret communications have been Secret Key encryption methods. Messages are encrypted using a secret key known only to the communicating parties. These keys needed to be distributed to all of the communicating parties, and kept strictly secret from all unauthorized third parties.

Since about 1975 new methods for secret communications, called Public Key methods, have been developed. Each party has a public key, which anyone may use to send them a secret message, and a private key which is used to read the message. The security comes from the presumption that, given a public encryption key, it is not computationally feasible to determine the private decryption key. The use of public key cryptography requires the distribution of the public keys, typically by establishing a key distribution authority or network.

The main difficulty with both Secret Key encryption and Public Key encryption is the distribution of the keys. A great deal of effort has gone into solving this problem. U.S. Pat. Nos. 4,200,770; 5,159,632; 5,271,061; 5,987,130; 6,212,279; 6,363,154; 6,377,689; 6,987,855; 6,993,136; 7,020,282; 7,120,696; 7,149,308; and 7,156,299 all deal with various proposed solutions to the key-distribution problem.

Another, more-recently developed class of methods for secret communications, called Private Key methods eliminate the key distribution problem altogether. For each message each party independently chooses a private, secret key which is used to encrypt the message. The inverse of this secret key is used to decrypt the message. These private keys are never distributed or divulged to anyone else, so that the sender does not know the receiver's private key, and vice-versa. After each message has been sent, the private keys are discarded and never used again.

Private Key methods use an exchange of 3 transmitted messages, to be designated here as SM, RSM and RM. The unencrypted message to be sent is designated as M. The sender forms the first transmitted message SM by encrypting the original, or plaintext, message M with the sender's private encryption function S (that is, the fixed encryption function using the sender's private key). So, the transmitted message denoted SM, is formed by applying the encryption function S to the message M. The receiver forms the second transmitted message RSM by encrypting SM with the receiver's secret encryption function R. This process is sometimes called superencryption. The message SM encrypted with R may be denoted RSM. This message is then sent back to the sender. The sender forms the third transmitted message RM by decrypting RSM using the sender's private decryption function S' which is the inverse of S. This strips off the first encryption, leaving RM encrypted with only the receiver's encryption function.

This procedure will result in the correct transmission of the message if the sender's encryption function and the receiver's encryption function commute. That is, RSM would be the same as SRM. Then when the sender applies the decryption function S' it produces S'RSM=S'SRM=RM. This third message is then sent back to the receiver who can remove the encryption by applying the receiver's private decryption function R' resulting in R'RM=M, which is the plaintext message.

This exchange of 3 messages is commonly called the Three-Pass Protocol. It may be described abstractly as follows: Let $E_S$, $E_R$, $D_S$ and $D_R$ be the sets of sender encryption functions, receiver encryption functions, sender decryption functions and receiver decryption functions, respectively. For each encryption function $e_S$ in $E_S$ or $e_R$ in $E_R$ there will be a corresponding decryption function $d_S$ in $D_S$ or $d_R$ in $D_R$. Let $e_S$ and $e_R$ be any sender and receiver encryption functions, and let $d_S$ and $d_R$, be their corresponding sender and receiver decryption functions. The three messages in the three-pass protocol will be $e_S M$, $e_R e_S M$ and $d_S e_R e_S M$. The final decrypted message will be $d_R d_S e_R e_S M$. The requirement for decrypting the message is that $d_R d_S e_R e_S M$ must be identical to M. This would be true if the encryption functions commuted with each other, that is, if $e_R e_S M$ were the same as $e_S e_R M$ for all $e_S$ in $E_S$ and $e_R$ in $E_R$. Similarly, it would be true if the decryption functions commuted with one another, or if the sender's decryption function commuted with the receiver's encryption function. (There are other possibilities. For example, the receiver's encryption function could consist of two steps, one of which commutes with the sender's encryption function, and one of which commutes with the sender's decryption function, for example $e_R = f_R g_R$ so that $d_R d_S e_R e_S M = d_R d_S f_R g_R e_S M = d_R f_R d_S e_S g_R M = d_R f_R g_R M = d_R e_R M = M$. This sort of commutativity is possible in theory, but is rare, or perhaps unknown, in practice. However, it does demonstrate that it is not strictly necessary for the encryption functions themselves to commute.)

The first three-pass method is due to Adi Shamir and described in Konheim, Allen G., "Cryptography—A Primer," John Wiley & Sons, 1981, pp 346-7, and also, in Menezes, A., van Oorschot, P., and Vanstone, S., "Handbook of Applied Cryptography," CRC Press, 1996, page 500. In the Shamir method, encryption consists of raising each block of the message to a large power modulo a large prime p, and decryption consists of raising each block to a power modulo the same prime, such that $(M^e)^d = M \pmod{p}$. Since $(M^e)^d = (M^d)^e$ the encryption and decryption functions all commute. There is a commercial encryption product called NK-Crypt from Master Software Corporation based on this method (NK-CRYPT Message Encryption System, www.mastersoftware.biz/nkcrypt.htm).

Given the modulus n and the values x and $x^m \pmod{n}$, determining the exponent m is called the Discrete Logarithm Problem. The fastest algorithm now known for solving the discrete logarithm problem modulo n is called the Index Calculus algorithm, and takes time proportional to $\exp(C(\log n)^{1/3}(\log \log n)^{2/3})$ where C is between 1.5 and 2. (The exact value of C depends on the form of n and certain details of the method which affect the storage required, so the value of C for any given n is determined by a space versus time trade-off.) The security of the Shamir method and the NK-Crypt software product rely on the assumption that no faster method for solving the Discrete Logarithm Problem will be discovered soon.

The chief drawback of the Shamir and related methods is that raising a large number to a large power modulo a large prime is very time-consuming.

U.S. Pat. No. 4,567,600 addresses the speed problem by using multiplication in a Galois field $GF(2^m)$ in place of multiplication modulo a prime p. This choice makes raising a number to a power faster, but it still requires a lot of multiplications of very large numbers, so the method is still slow.

There are two Private Key methods using the three-pass protocol which are very fast. These are the Bisi method disclosed in WO 03/007540 A1, and a freeware program called keylilla developed by Chanda Hedvikar-Hedvikar (see, e.g., www.bindhast.com/keylilla.htm). Both Bisi and keylilla use a random encryption key which is as long as the message itself. In Bisi, encryption consists of multiplying the message byte-by-byte by the secret key, and decryption consists of multiplying by the multiplicative inverse of that key. (Obviously all key bytes must be selected to have multiplicative inverses, otherwise the message cannot be decrypted.) In keylilla, encryption consists of exclusive-oring each byte of the message with the corresponding byte of the secret key, and decryption is identical to encryption, since exclusive-or is a self-inverse operation.

Let S and R represent the sender's and receiver's encryption keys, and S' and R' represent their decryption keys. In the Bisi method the 3 transmitted messages can therefore be represented as SM, RSM and RM=S'RSM. For each message character m which has a multiplicative inverse, the corresponding byte RSm will have the inverse $(RSm)'=R'S'm'$. If an eavesdropper has intercepted all three messages, multiplying $(Sm)(RSm)'(Rm)=(Sm)(R'S'm')(Rm)=m$. In other words, every character of the message which has a multiplicative inverse can be recovered by multiplying the first and third message by the multiplicative inverse of the second message.

In the keylilla method it is even simpler for the eavesdropper. Let + represent bytewise exclusive-or. Then the 3 transmitted messages are M+S, M+S+R and M+S+R+S=M+R. If an eavesdropper has intercepted all 3 messages, then simply taking the exclusive-or of the 3 messages together will recover the plaintext message, namely $(M+S)+(M+S+R)+(M+R)=(M+M+M)+(R+R)+(S+S)=M$.

To summarize, the Shamir and NK-Crypt method and the Massey-Omura method are secure, but not fast, while the Bisi method and the keylilla method are fast but not secure. The purpose of this invention is to provide a Private Key encryption method which is both fast and secure.

To lay the foundation for the disclosure of the invention, it is helpful to review some computer and mathematics basics which underlie the invention. In most modern computers, data, such as letters and numbers, are represented as binary numbers, that is, numbers in the base 2. Each binary digit, or bit, in a binary number may take either the value 0 or the value 1. A group of 8 bits, called a byte, is commonly used to represent small numbers or letters. For example, the byte 01000001 represents the number 65, or the letter "A" in ASCII code.

In a message, each character of the text is represented as one byte, and the entire message is represented as a string of bytes. A message of n characters is thus represented by a string of n bytes, or 8n bits. For some computers it may be more convenient to view the message as a string of larger or smaller units, such as 4-bit or 16-bit or 32-bit units, commonly called nibbles, halfwords and words, respectively. In some cases, it is advantageous to use single bits as units because multiple bits can be packed into one computer word and can be operated on in parallel. Any string of units can also be viewed as a sequence of blocks of units. The blocks can be, but do not necessarily need to be, the same length.

The ordinary operations of addition, subtraction, multiplication and division can be performed on binary numbers. There are also bitwise logical operations, also called Boolean operations, that can be performed on binary numbers, namely bitwise "and", bitwise "or" and bitwise "exclusive-or" or "xor". These operations are performed separately for each corresponding bit position. For example

| AND | OR | *XOR* |
|---|---|---|
| 00001111 | 00001111 | 00001111 |
| 01010101 | 01010101 | 01010101 |
| ... | ... | ... |
| 00000101 | 01011111 | 01011010 |

In a byte the leftmost bit is called the high-order bit, or most significant bit, and has the numeric value $2^7$ or 128, while the rightmost bit is called the low-order bit, or least-significant bit, and has the numeric value $2^0$ or 1.

In terms of the underlying mathematics, if m and n are positive integers, then the residue of n modulo m means the remainder when n is divided by m. The residue of n modulo m is denoted n (mod m) and m is called the modulus. So 42 (mod 10)=2. If x and y have the same residue modulo m this is denoted x=y (mod m). For example, 32=42 (mod 10). The operation which calculates the residue is called modulus division.

Any number which evenly divides m is called a factor of m. If n is a factor of m then m=0 (mod n), for example 12=0 (mod 4). If a positive integer p has no factors except 1 and p itself, then p is called a prime number, or simply a prime. For example, 2, 3, 5 7 and 11 are primes, but 9 is not prime because it is evenly divisible by 3. The factorization of an integer n expresses n as a product of primes. For example, the factorization of 90 is $2 \cdot 3^2 \cdot 5$. If m and n have no factors in common then they are called relatively prime or coprime. For example, 8 and 15 are relatively prime.

A mathematical ring, or simply a ring, is a set of elements, or scalars, for which two operations are defined, commonly called scalar addition and scalar multiplication. Scalar addition, or simply addition, is usually denoted x+y, and scalar multiplication, or simply multiplication, is denoted xy. Scalar addition is commutative, that is x+y=y+x. Scalar addition and multiplication are associative. That is, (x+y)+z=x+(y+z) and (xy)z=x(yz). Scalar multiplication is also distributive over scalar addition. That is, x(y+z)=xy+xz and (x+y)z=xz+yz.

Every ring has an additive identity, usually denoted 0, such that x+0=0+x=x, and a multiplicative identity, usually denoted 1, for which 1x=x1=x for all x.

Each ring element x has an additive inverse. The additive inverse of the scalar x is denoted −x and addition of an additive inverse a+(−x) is usually shortened to a−x, with x−x=0. If x is an element of a ring, any element x' for which x'x=1 is called a left multiplicative inverse of x, and any element x' for which xx'=1 is called a right multiplicative inverse of x. An element may have more than one left multiplicative inverse or more than one right multiplicative inverse. If x has both a left multiplicative inverse x' and a right multiplicative inverse x", then they will be equal because (x'x)x"=x'(xx") so (1)x"=x'(1) or x"=x'. In that case x' is unique, and it is called the multiplicative inverse, or simply the inverse of x. If every element in the ring, except 0, has a multiplicative inverse, then the ring is called a field.

The best-known example of a ring is the integers using standard addition and multiplication. Every integer n has an additive inverse −n, but only the integers 1 and −1 have multiplicative inverses. A well-known example of a field is the rational numbers m/n, where m and n are integers and n is not equal to 0. The additive inverse of the rational number m/n is −m/n, and exists for all rational numbers. The multiplicative inverse (m/n)' of the rational number m/n is n/m and exists for every rational number except 0. If the ring multiplication is commutative, that is if xy=yx, then the ring is called a commutative ring.

Another example of a ring is the integers modulo some integer m. The additive inverse of x modulo m is 0 when m=0, and m−x otherwise. Every integer n which is mutually prime to m will have a multiplicative inverse n' such that nn'=1 (mod m). In particular, if m is of the form $2^u$ then n will have a multiplicative inverse when n is odd. If m is prime, then the integers modulo m form a field which is denoted GF(p) standing for Galois Field of order p (in honor of Évariste Galois, 1811-1832).

A matrix is a rectangular array of elements from a ring. A matrix A with m rows and n columns is called a matrix of order m×n, or simply an m×n matrix, and the element in the i-th row and j-th column is designated $A_{ij}$ where i can range from 1 to m, and j can range from 1 to n. A matrix with only 1 row is called a row matrix or a row vector, a matrix with only 1 column is called a column matrix or a column vector, and a matrix with an equal number of rows and columns is called a square matrix. That is, a row matrix is 1×n, a column matrix is n×1, and a square matrix is n×n.

An m×n matrix A and an n×p matrix B can be multiplied to produce an m×p matrix C. This is denoted AB=C and C is called the matrix product of A and B. The element $C_{ij}$ in the i-th row and j-th column of C is formed from the i-th row of A and the j-th column of B by summing $A_{i1}B_{1j}+A_{i2}B_{2j}+ \ldots +A_{in}B_{nj}$. The addition and multiplication in this expression is the ring addition and multiplication for the type of scalars used in the matrix. They may be the ordinary addition and multiplication of real numbers, they may be addition and multiplication of integers modulo some number, or they may be other mathematical operations.

Matrix multiplication is associative. That is, if A is an m×n matrix, B is an n×p matrix and C is a p×r matrix, then (AB)C=A(BC). Consequently, the set of n×n square matrices over a ring is itself a ring.

In a square n×n matrix A an element $A_{ii}$ is called a diagonal element, and the set of elements $A_{11}, A_{22}, \ldots, A_{nn}$ are called the diagonal of the matrix. A diagonal matrix is a matrix whose only non-zero elements all lie on the diagonal. The diagonal matrix I whose diagonal elements are all 1 is called the identity matrix. The identity matrix has the property that AI=A and IA=A for any square matrix A. Any matrix A', if one exists, for which A'A=I is called a left inverse of A, and any matrix A' for which AA'=I is called a right inverse of A. A matrix may have more than one left inverse, or more than one right inverse. A matrix which has a left inverse is called left invertible, and a matrix which has a right inverse is called right invertible. If A has at least one left inverse and at least one right inverse matrix, then all of its inverse matrices will be equal, and this unique inverse matrix is simply called the inverse of A. A matrix which has an inverse is called invertible. (It is beyond the scope of this discussion, but a matrix over a commutative ring will be invertible whenever the value of its determinant has a multiplicative inverse in the ring.)

In the matrix product AB we say that B is left-multiplied by A and that A is right-multiplied by B. Two square matrices A and B commute if AB=BA. In general, matrix multiplication is not commutative. That is, in most cases the matrix product AB will not be the same as BA. If all of the matrices in a set F of square matrices commute with each other, then F is called a commutative family of matrices. If the ring is commutative, then the diagonal matrices are a commutative family, but other commutative families, containing non-diagonal matrices, may also exist. It is possible to have a commutative family of matrices over a ring even when the ring itself is not commutative.

If A and B are matrices in a commutative family F, then their product AB could also be in that family. This is because if C is any matrix in the family then C(AB)=(CA)B=(AC)B=A(CB)=A(BC)=(AB)C. So AB commutes with C. Henceforth it will be assumed that each commutative family F is closed under matrix multiplication, that is, if A and B are members, then AB is also a member.

A linear equation over a commutative ring is an equation of the form is an equation of the form $a_1x_1+a_2x_2+\ldots+a_nx_n+b=0$ where $a_1, a_2, \ldots, a_n$ and b are constant ring elements and $x_1, x_2, \ldots, x_n$ are variables. If $L_1, L_2, \ldots, L_m$ are linear equations, then $L=c_1L_1+c_2L_2+\ldots+c_mL_m$ is a linear combination of the equations $L_1, L_2, \ldots, L_m$. If L cannot be expressed as a linear combination of $L_1, L_2, \ldots, L_m$ then it is linearly independent of them. In a system of linear equations, the maximum number of linearly independent equations is called the rank of the system.

There are several forms for linear equations over a non-commutative ring. The form best suited for this disclosure is $a_1x_1+a_2x_2+\ldots+a_nx_n+x_1b_1+x_2b_2+\ldots+x_nb_n+c=0$ where $a_1, a_2, \ldots, a_n, b_1, b_2, \ldots, b_n$ and c are constant ring elements and $x_1, x_2, \ldots, x_n$ are variables.

If F is a commutative family of n×n square matrices over a ring, and M is any matrix in that family, then the matrix X can belong to the family only if XM=MX. The matrix X has $n^2$ entries, each of which is an element of the ring. The relationship XM=MX is equivalent to a set of $n^2$ linear equations over the ring, however these equations are not linearly independent. For most familiar rings, the set of commutativity equations will contain n(n−d) linearly independent equations. For the largest possible commutative family of matrices over the ring d will be 1 If s is the size of this maximal family, then for a commutative family with a different value of d the size of the family will be about $s^{1/d}$ or $\sqrt[d]{s}$.

SUMMARY OF THE INVENTION

One party sends a securely encrypted message to a second party. Each party chooses a secret message key for the message, which is never shared with or transmitted to any other party. The message is sent by means of three encrypted messages. The first encrypted message is sent from the sender to the receiver, and is encrypted by the sender's key. The second encrypted message is sent from the receiver back to the sender, and is encrypted by both the sender's key and then by the receiver's key. The third encrypted message is sent from the sender back to the receiver, and is encrypted by only the receiver's key following removal of the sender's key. Finally, the receiver decrypts the third message.

The messages are sent in blocks. Encryption consists of multiplying each block of the message by square matrices of the same size as the block, and decryption consists of multiplying by the inverse matrices. The key matrices are taken from one or more large commutative families of matrices. This commutativity allows the sender's keys to be removed even though the message block has been encrypted by the sender's key first and then the receiver's key.

By using a suitable type of matrix multiplication, and sufficiently large matrices, the method can be made arbitrarily secure while still being fast.

Two variations of the invention will be presented, using one-sided and two-sided matrix multiplication, respectively. The one-sided matrix multiplication will be illustrated throughout with left matrix multiplication, but it is understood that right matrix multiplication is equally valid, and falls within the scope of this disclosure.

BRIEF DESCRIPTION OF THE DRAWINGS

The features of the invention believed to be novel are set forth in the appended claims. The invention, however, together with further objects and advantages thereof, may better be understood by reference to the following description taken in conjunction with the accompanying drawings and appendices summarized below.

The two figures illustrate the flow of encrypted messages between the sending and receiving parties, enabling secure communication without ever transmitting encryption keys.

DETAILED DESCRIPTION

Figure 1:
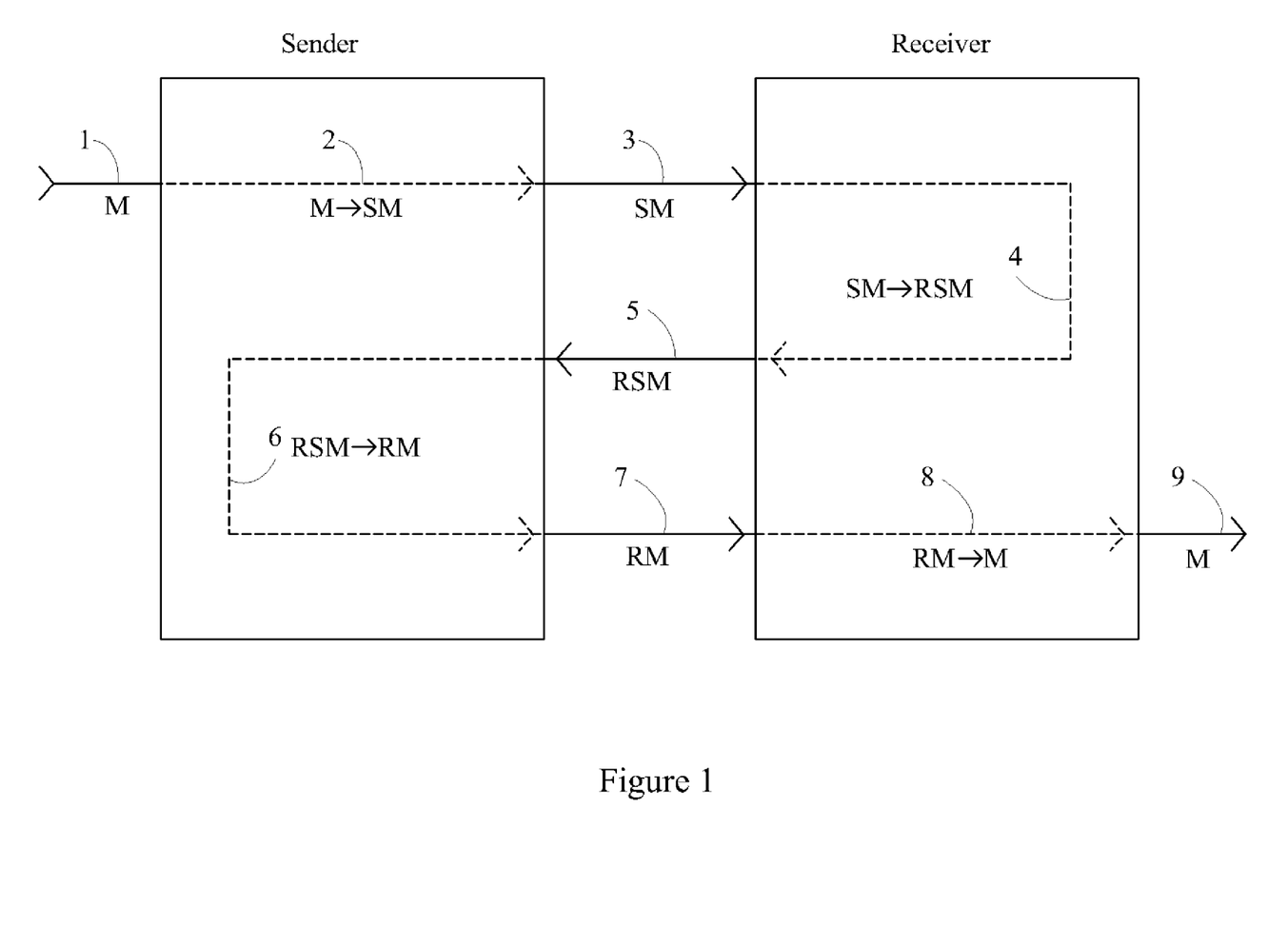
FIG. 1 illustrates a primary embodiment employing one-sided matrix multiplication.

FIG. 1 illustrates the following flow sequence with respect to the transmission, encryption and decryption of messages sent in accordance with various one-sided embodiments of the invention, and will be elaborated further in the discussion to follow.

The box on the left containing reference numerals 2 and 6 schematically represents a computerized device of the sender, including storage and processing capacity in accordance with the known computer arts. The box on the right containing reference numerals 4 and 8 schematically represents a computerized device of the receiver, similarly including storage and processing capacity in accordance with the known computer arts. The steps 2, 4, 6 and 8 enclosed by these boxes thereby represent computer processing steps, and are indicated by dashed lines. The solid lines 3, 5 and 7 represent message transmissions steps, particularly, the transmission of information between the sender's and receiver's computerized devices.

The sender starts with an original plaintext message designated as M at 1. First, the sender encrypts the message with the sender's encryption key, at 2. In the several preferred embodiments, each block $M_i$ of the message M is multiplied by the sender's key matrix $S_i$ to form a new message designated SM at 3. This is the original message M encrypted with the sender's key. Each block $M_i$ of the original message has been multiplied by the sender's corresponding encryption key matrix $S_i$.

Next, SM 3 is further encrypted (superencrypted) with the receiver's encryption key, at 4. In the several one-sided embodiments, each block $S_iM_i$ of the encrypted message SM is multiplied by the receiver's key matrix $R_i$ to form the next message designated RSM at 5. This is message SM encrypted with the receiver's key. Each block $S_iM_i$ of message SM has been multiplied by the corresponding receiver's key matrix $R_i$ to produce the block $R_iS_iM_i$. Since the matrices $S_i$ and $R_i$ are taken from a commutative family of matrices, the message RSM is equivalent to encrypting M first with the receiver's key and then with the sender's key, that is, RSM=SRM.

Next, RSM 5 is decrypted with the sender's decryption key, at 6. Each sender's decryption matrix $S_i'$ is the left multiplicative inverse of the sender's encryption matrix $S_i$. Each block of message RSM is multiplied by the corresponding sender's decryption key matrix $S_i'$ to form the next message designated RM at 7. At this point, each block of the original message has been multiplied by $S_i'R_iS_i$. If $M_i$ is any block of the message, then the corresponding block of message RM is $S_i'R_iS_iM_i$ which is the same as $S_i'S_iR_iM_i$ which equals $R_iM_i$ which is the same as $M_i$ encrypted with the receiver's encryption key $R_i$.

Finally, RM 7 is decrypted with the receiver's decryption key R' at 8. Each block $M_i$ of the message RM is multiplied by the receiver's decryption key matrix $R_i'$ to form the final message M. If $M_i$ is any block of the original message, the corresponding block of message RM will be $R_iM_i$. Multiplying this by the receiver's decryption key matrix $R_i'$ gives $R_i'R_iM_i$ which is the same as $M_i$. Therefore this final decryption step produces the message M at 9, which is precisely equal to the original plaintext message M at 1.

Figure 2:
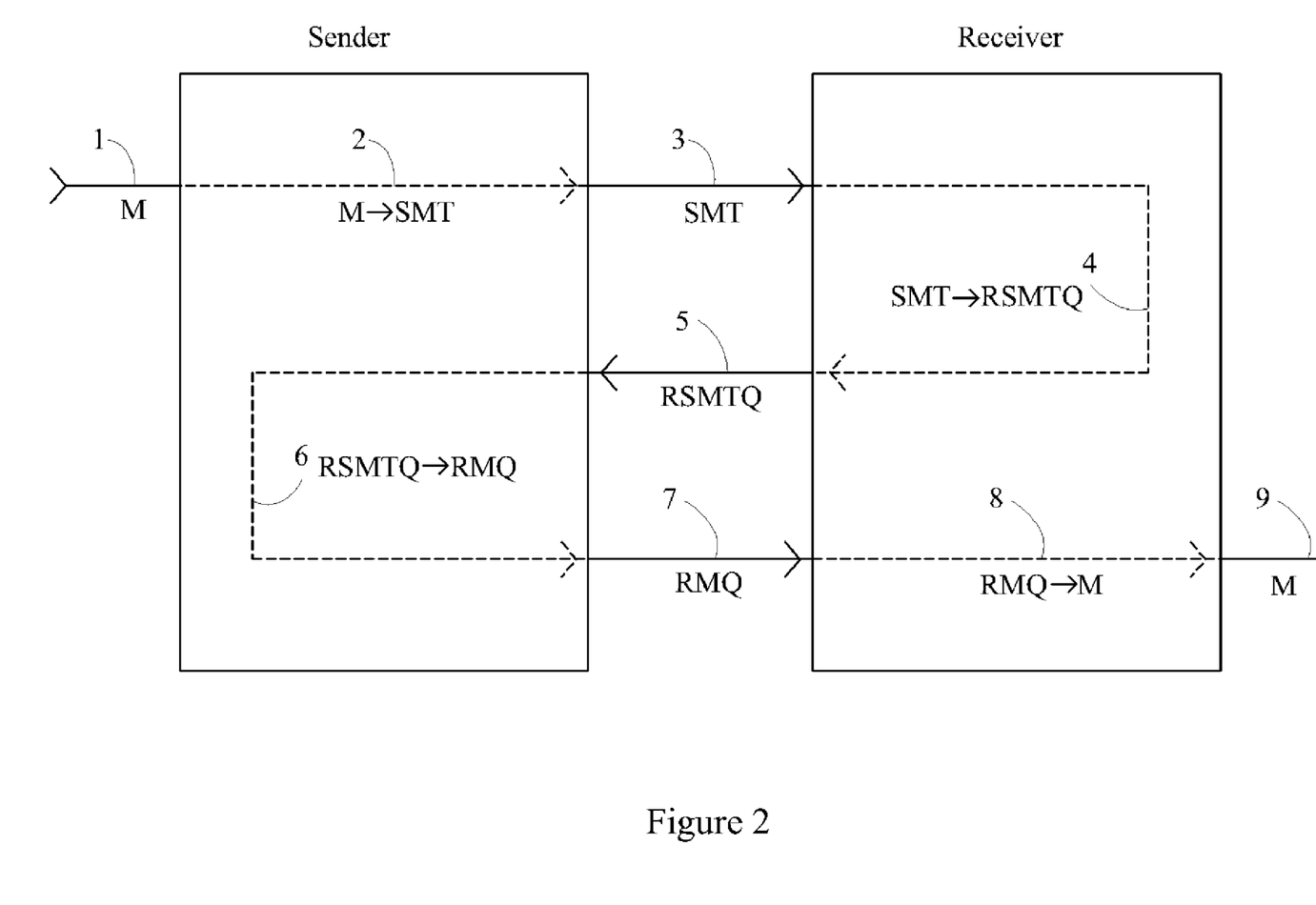
FIG. 2 illustrates a primary embodiment with two-sided multiplication.

FIG. 2 illustrates the following flow sequence with respect to the transmission, encryption and decryption of messages sent in accordance with various two-sided embodiments of the invention, and will be elaborated further in the discussion to follow.

The box on the left containing reference numerals 2 and 6 schematically represents a computerized device of the sender, including storage and processing capacity in accordance with the known computer arts. The box on the right containing reference numerals 4 and 8 schematically represents a computerized device of the receiver, similarly including storage and processing capacity in accordance with the known computer arts. The steps 2, 4, 6 and 8 enclosed by these boxes thereby represent computer processing steps, and are indicated by dashed lines. The solid lines 3, 5 and 7 represent message transmissions steps, particularly, the transmission of information between the sender's and receiver's computerized devices.

The sender starts with an original plaintext message designated as M at 1. First, the sender encrypts the message with the sender's encryption key, at 2. In the several preferred embodiments, each block $M_i$ of the message M is multiplied by the sender's key matrices $S_i$ and $T_i$ to form a new message designated SMT at 3. This is the original message M encrypted with the sender's key. Each block $M_i$ of the original message has been multiplied by the sender's corresponding encryption key matrices $S_i$ and $T_i$.

Next, SMT 3 is further encrypted (superencrypted) with the receiver's encryption key, at 4. In the several two-sided embodiments, each block $S_iM_iT_i$ of the encrypted message SMT is multiplied by the receiver's key matrices $R_i$ and $Q_i$ to form the next message designated RSMTQ at 5. This is message SMT encrypted with the receiver's key. Each block $S_iM_iT_i$ of message SMT has been multiplied by the corresponding receiver's key matrices $R_i$ and $Q_i$ to produce the block $R_iS_iM_iT_iQ_i$. Since the matrices $S_i$ and $R_i$ are taken from a commutative family of matrices, and the matrices $T_i$ and $Q_i$ are taken from another commutative family of matrices, the message RSMTQ is equivalent to encrypting M first with the receiver's key and then with the sender's key, that is, RSMTQ=SRMQT.

Next, RSMTQ 5 is decrypted with the sender's decryption key, at 6. The sender's decryption matrices $S_i'$ and $T_i'$ are the left and right multiplicative inverses of the sender's encryption matrices $S_i$ and $T_i$, respectively. Each block of message RSMTQ is multiplied by the corresponding sender's decryption key matrices $S_i'$ and $T_i'$ to form the next message designated RMQ at 7. At this point, each block of the original message has been multiplied by $S_i'R_iS_i$ and $T_iQ_iT_i'$. If $M_i$ is any block of the message, then the corresponding block of message RMQ is $S_i'R_iS_iM_iT_iQ_iT_i'$ which is the same as $S_i'S_iR_iM_iQ_iT_iT_i'$ which equals $R_iM_iQ_i$ which is the same as $M_i$ encrypted with the receiver's encryption keys $R_i$ and $Q_i$.

Finally, RMQ 7 is decrypted with the receiver's decryption keys R' and Q', at 8. Each block $M_i$ of the message RMQ is multiplied by the receiver's decryption key matrices $R_i'$ and $Q_i'$ to form the final message M. If $M_i$ is any block of the original message, the corresponding block of message RMQ will equal $R_iM_iQ_i$. Multiplying this by the receiver's decryption key matrices $R_i'$ and $Q_i'$ gives $R_i'R_iM_iQ_iQ_i'$ which is the same as $M_i$. Therefore this final decryption step produces the message M at 9, which is precisely equal to the original plaintext message M at 1.

Now, we explore all of this in more detail.

Suppose that Sender wishes to send a message M to Receiver. We assume throughout that all communications between Sender and Receiver are being intercepted by an eavesdropper. Sender and Receiver wish to prevent the eavesdropper, despite this interception, from learning the contents of the message. Thus, even assuming that the eavesdropper has complete access to everything transmitted between Sender and Receiver, and full knowledge of the methods and apparatus being used, the invention disclosed herein is designed to make it effectively impossible for the eavesdropper to reconstruct the message M.

The encryption method and supporting apparatus, software, etc. has 5 goals: (1) it must communicate the message accurately, (2) it must not require any transmission of keys between Sender and Receiver (each party's keys are kept privately without any knowledge or access by the other party), (3) it must be secure even if the eavesdropper intercepts all traffic, (4) it is desirable that the encryption and decryption process between Sender and Receiver be reasonably fast, and (5) it is desirable that each transmitted message be not significantly longer than the original message.

The first goal is an absolute requirement. The second goal is what distinguishes Private Key encryption from all other encryption methods. The third goal is a question of degrees. The current standard for security is that the eavesdropper must have to try about $2^{128}$ keys to decipher a message. It is generally believed that this level of security should keep messages safe through the year 2020. For applications requiring a longer timeframe, a larger value such as $2^{160}$ should be chosen. This disclosure will present embodiments of the invention which meet or exceed the current standard. The last two goals are desirable features, but not requirements. Depending upon the application, some speed or extra message length can be sacrificed in order to achieve higher security, or speed and message length can be traded against each other.

To begin the encryption process, Sender breaks the message M into k blocks of units. The blocks are designated $M_1$, $M_2$, $M_3$, . . . , $M_k$. For the one-sided method the blocks are vectors of units of size $b_1, b_2, \ldots, b_k$ units, respectively, where $b_1+b_2+ \ldots +b_k$ is the total length of the message in units (padded, if necessary). For the two-sided method the message blocks are matrices of units. The block sizes are $b_1 \times c_1$, $b_2 \times c_2$, . . . , $b_k \times c_k$ units, respectively, where $b_1c_1 + b_2c_2 + \ldots +b_kc_k$ is the total length of the message in units (padded, if necessary). Each unit is a numerical representation of an element in the ring, and each block is treated as a $b_i \times c_i$ matrix of ring elements. The correspondence between the numerical representation of characters in the message and the numerical representation of the scalar elements in the ring is simply a matter of changing the number base, or radix. It is similar to the process of converting numbers from decimal notation to binary notation or to hexadecimal notation. The process is well-known in the computer art and needs no further elaboration. (Most current cryptography texts ignore this conversion step entirely. It is understood implicitly.) It is assumed that before the message is encrypted by the sender, and after the message has been decrypted by the receiver, the transformations from characters to ring scalars and then back to characters are performed.

In the one-sided method, for each message block $M_i$ Sender and Receiver independently choose left-invertible square matrices $S_i$, and $R_i$ of size $b_i \times b_i$ which are their private encryption keys for that block. These private keys $S_i$, and $R_i$ are kept strictly secret. Sender and Receiver never transmit or reveal their private keys to anyone. In particular Sender will not know $R_i$, Receiver will not know $S_i$, and the eavesdropper will not know $S_i$ or $R_i$.

If message blocks of different sizes are being used, then there needs to be a separate commutative family of matrices for each distinct size. The commutative family of left-invertible $b \times b$ square matrices may be denoted F(b). The left-side encryption matrices S and R will be taken from F(b). (It is just as valid to perform the encryption and decryption using matrix right-multiplication, and this disclosure is construed to cover both methods.)

To transmit the message M, Sender and Receiver will exchange 3 messages using the three-pass protocol, as described above in relation to FIG. 2. First, Sender sends a message SM to Receiver in which each message block $M_i$, treated as a vector of $b_i$ units, is multiplied by Sender's key matrix $S_i$, resulting in a new vector of the same size. So the first transmitted message SM is $S_1M_1, S_2M_2, \ldots, S_kM_k$ with all of the matrix scalar operations performed on ring elements.

Next, Receiver takes the message SM, multiplies each block of the message by $R_i$ and sends the new message RSM back to Sender. The i-th block of this new message RSM will be $R_iS_iM_i$. This message, therefore, is encrypted with both Sender's keys and Receiver's keys.

Next, Sender takes the second message RSM and multiplies each block by the left inverse matrix $S_i'$ of $S_i$ and sends this third message RM back to Receiver. The i-th block of this new message RM will be $S_i'R_iS_iM_i$. As noted before, matrix multiplication is not usually commutative, so the key matrices $S_i$ and $R_i$ must be chosen from a commutative family $F(b_i)$ of left-invertible matrices. When $S_i$ and $R_i$ commute, then $S_i'R_iS_iM_i=S_i'S_iR_iM_i=IR_iM_i=R_iM_i$. When Sender left-multiplies each block of the second message RSM by $S_i'$, this strips off the encryption with Sender's private key, and leaves the message RM which is encrypted only with Receiver's private keys.

Finally, when Receiver gets the third message RM, Receiver multiplies each block by $R_i'$. The i-th block of this final message will be $R_i'R_iM_i=IM_i=M_i$. This recovers the original message M, namely $M_1, M_2, \ldots, M_k$.

It is important to note that all of the operations involving $S_i$ and $T_i$ are performed by Sender, and that all of the operations involving $R_i$ and $Q_i$ are performed by Receiver, so neither party ever needs to know the other's private keys. After the message exchange is completed, the key matrices $S_i$, $T_i$, $R_i$ and $Q_i$ may be permanently erased. New, independent choices of $S_i$, $T_i$, $R_i$ and $Q_i$ may be used for the next message. No record of the keys needs to be kept in either the sender's or the receiver's device, so that an eavesdropper who obtained physical access to these devices after the message transmission has been completed still would be unable to recover the keys and thereby decrypt the message.

To summarize the one-sided method: Sender encrypts the message M with the keys $S_i$ to form SM. Receiver encrypts the message SM with the keys $R_i$ to form RSM (so the second message RSM is encrypted using key matrices $S_i$ and $R_i$). Then Sender removes the keys $S_i$ from RSM to form RM. Finally Receiver removes the keys $R_i$ from RM to recover the original unencrypted message M.

In the two-sided method for each message block $M_i$ Sender and Receiver independently choose left-invertible square matrices $S_i$, and $R_i$ of size $b_i \times b_i$ and right-invertible square matrices $T_i$, and $Q_i$ of size $c_i \times c_i$ which are their private encryption keys for that block. These private keys $S_i$, $T_i$, $R_i$ and $Q_i$ are kept strictly secret. Sender and Receiver never transmit or reveal their private keys to anyone. In particular Sender will not know $R_i$ or $Q_i$, Receiver will not know $S_i$ or $T_i$, and the eavesdropper will not know $S_i$, $T_i$, $R_i$ or $Q_i$.

If message blocks of different sizes are being used, then there needs to be a separate commutative family of matrices for each distinct size. The commutative family of left-invertible $b \times b$ square matrices may be denoted F(b) and the commutative family of right-invertible $c \times c$ square matrices may be denoted G(c). The left-side encryption matrices S and R will be taken from F(b) and the right-side encryption matrices T and Q will be taken from G(c).

To transmit the message M, Sender and Receiver will exchange 3 messages using the three-pass protocol, as described above in relation to FIG. 1. First, Sender sends a message SMT to Receiver in which each message block $M_i$, treated as a $b_i \times c_i$ matrix, is multiplied by Sender's key matrices $S_i$ and $T_i$, resulting in a new $b_i \times c_i$ matrix. So the first transmitted message SMT is $S_1M_1T_1, S_2M_2T_2, \ldots, S_kM_kT_k$ with all of the matrix scalar operations performed on ring elements.

Next, Receiver takes the message SMT, multiplies each block of the message by $R_i$ and $Q_i$ and sends the new message RSMTQ back to Sender. The i-th block of this new message RSMTQ will be $R_iS_iM_iT_iQ_i$. This message, therefore, is encrypted with both Sender's keys and Receiver's keys.

Next, Sender takes the second message RSMTQ and multiplies each block by the left inverse matrix $S_i'$ of $S_i$ and the right inverse matrix $T_i'$ of $T_i$ and sends this third message RMQ back to Receiver. The i-th block of this new message RMQ will be $S_i'R_iS_iM_iT_iQ_iT_i'$. As noted before, matrix multiplication is not usually commutative, so the key matrices $S_i$ and $R_i$ must be chosen from a commutative family $F(b_i)$ of left-invertible matrices and the key matrices $T_i$ and $Q_i$ must be chosen from a commutative family $G(c_i)$ of right-invertible matrices. When $S_i$ and $R_i$ commute and $T_i$ and $Q_i$ commute, then $S_i'R_iS_iM_iT_iQ_iT_i'=S_i'S_iR_iM_iQ_iT_iT_i'=IR_iM_iQ_iI=R_iM_iQ_i$. It is not necessary for $S_i'$ and $T_i'$ to commute with any of the other matrices. When Sender left-multiplies each block of the second message RSMTQ by $S_i'$, and right-multiplies the block by $T_i'$ this strips off the encryption with Sender's private keys, and leaves the message RMQ which is encrypted only with Receiver's private keys.

Finally, when Receiver gets the third message RMQ, Receiver multiplies each block by $R_i'$ and $Q_i'$. The i-th block of this final message will be $R_i'R_iM_iQ_iQ_i'=IM_iI=M_i$. This recovers the original message M, namely $M_1, M_2, \ldots, M_k$.

It is important to note that all of the operations involving $S_i$ and $T_i$ are performed by Sender, and that all of the operations involving $R_i$ and $Q_i$ are performed by Receiver, so neither party ever needs to know the other's private keys. After the message exchange is completed, the key matrices $S_i$, $T_i$, $R_i$ and $Q_i$ may be permanently erased. New, independent choices of $S_i$, $T_i$, $R_i$ and $Q_i$ may be used for the next message. No record of the keys needs to be kept in either the sender's or the receiver's device, so that an eavesdropper who obtained physical access to these devices after the message transmission has been completed still would be unable to recover the keys and thereby decrypt the message.

To summarize the two-sided method: Sender encrypts the message M with the keys $S_i$ and T to form SMT. Receiver encrypts the message SMT with the keys $R_i$ and $Q_i$ to form RSMTQ (so the second message RSMTQ is encrypted using all key matrices, $S_i$, $T_i$, $R_i$ and $Q_i$). Then Sender removes the keys $S_i$ and $T_i$ from RSMTQ to make RMQ. Finally Receiver removes the keys $R_i$ and $Q_i$ from RMQ to recover the original unencrypted message M.

Now let's turn to security. The one-sided method is simpler, so we discuss that method first. Assume that the eavesdropper has intercepted all three messages, and also knows the size of each block, hence the sizes of all of the key matrices $S_i$ and $R_i$. The eavesdropper's task is to determine each message block from the values of $S_iM_i$, $R_iS_iM_i$ and $R_iM_i$. If the eavesdropper can determine either the value of $S_i$ or the value of $R_i$, this would be sufficient to find $M_i$. It is crucial, therefore, to choose matrices $S_i$ and $R_i$ which prevent this. The first step is to choose the ring, or equivalently, the type of matrix multiplication. The second step is to choose values of $b_i$. The third step is to choose commutative families of $b_i \times b_i$ left-invertible square matrices so that together they balance the 5 goals (particularly the last three, as the first two are absolute requirements) as much as possible.

The security of this method will depend upon how many different matrices $S_i$, and $R_i$ are available, and how large they are. To determine these requires knowing some specifics of the matrix multiplication, however one general observation applies. Since the sender's key matrices and the receiver's key matrices must commute, the sender and the receiver must choose the key matrices for each block from the same commutative families of matrices. Since no keys are transmitted, these families of key matrices could reasonably be built into the encryption device or its software. Therefore it should be assumed that the eavesdropper knows what families of matrices are being used.

Suppose that each family contains m different matrices. If m were small, then the eavesdropper could simply try each possible key matrix on each message block. To prevent this type of exhaustive attack, m would need to be extremely large, at least $2^{128}$ by current security standards. To be clear, this does not mean the encryption device must contain $2^{128}$ different key matrices in its storage. Rather, the device could have a mechanism for generating any of at least $2^{128}$ key matrices by some mathematical calculation, possibly utilizing some small set of stored matrices.

The basic idea here is that each encryption matrix chosen by either Sender or Receiver for any given message block $M_i$ contains $b_i^2$ scalar elements which are unknown to the eavesdropper. To simplify the discussion, consider a message of just one block M of size b units. Knowing, say X=SM and Y=RSM gives b equations in $b^2$ unknowns.

Since R is a matrix in the commutative family F(b), it was noted earlier that the $b^2$ unknown scalar elements in R each matrix must obey b(b−d) constraints common to all members of F(b). If d=1 then there would be a total of b+b(b−1)=$b^2$ equations in the $b^2$ unknowns. If the ring is commutative then these equations could easily be solved by standard methods of linear algebra. Consequently either d must be at least 2, or the ring must not be commutative.

The practical consequence of making d greater than 1 is that the matrices must be made about d times as large as they would be if d=1 in order to have at least $2^{128}$ matrices in the commutative family.

Now let's turn to the security of the two-sided method. Assume that the eavesdropper has intercepted all three messages, and also knows the size of each block, hence the sizes of all of the key matrices $S_i$, $T_i$, $R_i$ and $Q_i$. The eavesdropper's task is to determine each message block from the values of $S_i M_i T_i$, $R_i S_i M_i T_i Q_i$ and $R_i M_i Q_i$. If the eavesdropper can determine the value of any one of $S_i$, $T_i$, $R_i$ or $Q_i$, this would be sufficient to find $M_i$. It is crucial, therefore, to choose matrices $S_i$, $T_i$, $R_i$ and $Q_i$ which prevent this. The first step is to choose the ring, or equivalently, the type of matrix multiplication. The second step is to choose values of $b_i$ and $c_i$. The third step is to choose commutative families of $b_i \times b_i$ left-invertible square matrices and commutative families of $c_i \times c_i$ right-invertible square matrices so that together they balance the 5 goals (particularly the last three, as the first two are absolute requirements) as much as possible.

The security of this method will depend upon how many different matrices $S_i$, $T_i$, $R_i$ and $Q_i$ are available, and how large they are. To determine these requires knowing some specifics of the matrix multiplication, however one general observation applies. Since the sender's key matrices and the receiver's key matrices must commute, the sender and the receiver must choose the key matrices for each block from the same commutative families of matrices. Since no keys are transmitted, these families of key matrices could reasonably be built into the encryption device or its software. Therefore it should be assumed that the eavesdropper knows what families of matrices are being used.

Suppose that each family contains m different matrices. If m were small, then the eavesdropper could simply try each possible key matrix on each message block. It is sufficient for the eavesdropper to try only the values of $S_i$, or $R_i$, because then $T_i$, or $Q_i$ can easily be determined by standard methods of linear algebra, and vice-versa. To prevent this type of exhaustive attack, m would need to be extremely large, at least $2^{128}$ by current security standards. To be clear, this does not mean the device must contain $2^{128}$ different key matrices in its storage. Rather, the device would preferably have a mechanism for generating any of at least $2^{128}$ key matrices by some mathematical calculation, for example, utilizing some small set of stored matrices.

The basic idea here is that each encryption matrix chosen by either Sender or Receiver for any given message block $M_i$ contains either $b_i^2$ or $c_i^2$ scalar elements which are unknown to the eavesdropper, for a total of $b_i^2 + c_i^2$ unknowns. To simplify the discussion, consider a message of just one block M of size b×c. Knowing, say X=SMT and Y=RSMTQ gives bc equations in $b^2 + c^2$ unknowns. Since $b^2 + c^2 \geq 2bc$ it is not possible to solve for $b^2 + c^2$ unknowns with only bc equations.

Unfortunately, the situation is not that simple. As noted earlier, since R and Q are matrices in the commutative families F(b) and G(c), the $b^2$ or $c^2$ unknown scalar elements in each matrix must obey certain constraints common to all members of those commutative families. To simplify the discussion, consider just one preferred embodiment of the invention, using the ring GF(p), which consists of the integers modulo a prime p, with ring addition and multiplication performed modulo p. In this embodiment the largest possible number of matrices is $p^b$ in F and $p^c$ in G.

The scalars in the matrices in such a maximal commutative family of matrices will satisfy b(b−1) and c(c−1) linear constraints, or linear equations. Knowing the value of both X and Y provides another bc equations involving the $b^2 + c^2$ elements of R and Q. However, these are quadratic constraints, or quadratic equations, involving the products of the elements in R with the elements in Q. There are $b^2 c^2$ different pairwise products. In general, large systems of quadratic equations modulo p are intractable, but using the b(b−1)+c(c−1) linear equations allows the number of distinct products in the system of quadratic equations to be reduced from $b^2 c^2$ to bc. Each product may then be considered as a separate variable, giving bc linear equations in bc variables, which can be solved by the standard methods of linear algebra. The process of replacing products with new variables is called linearization.

For this reason, the families F and G cannot be chosen to have maximal size. For many values of b and p there will be smaller commutative families whose member matrices satisfy b(b−d) linear constraints rather than b(b−1) linear constraints, for various values of d. (The possible values of d depend on the factorization of $p^n-1$.) Correspondingly, the matrices in G will satisfy c(c−e) linear constraints. The number of members of such a family tends to be about $p^{n/d}$. To obtain the desired number of matrices in the family, it is necessary that $p^{n/d} > 2^{128}$, or, equivalently, $p^n > 2^{128d}$. In other words, the matrices must be made d times as large in order to get sufficiently large commutative families. Since larger matrices mean slower encryption, the smallest possible value of d should be chosen, namely d=2 whenever possible.

With d=e=2 for both F and G there will be b(b−2)+c(c−2) linear equations and bc quadratic equations in $b^2 + c^2$ variables. Substituting for some of these variables by using the linear equations allows the number of variables in the quadratic equations to be reduced to 2b+2c, with 4bc distinct pairwise products. This system of quadratic equations requires considerable time and storage to attack. The next few paragraphs will look at this issue in more detail.

The leading method for solving systems of polynomial equations in a commutative ring is called extended linearization, or XL. Suppose that the unknowns in the equations are $x_1, x_2, \ldots x_n$. In the XL method, the set of equations is successively multiplied through by the linear terms $x_1$, $x_2, \ldots, x_n$, then the quadratic terms $x_1^2, x_1 x_2, \ldots, x_{n-1} x_n, x_n^2$, the cubic terms $x_1^3, x_1^2 x_2, \ldots, x_n^3$, and so forth, creating new equations. Because the ring is commutative $x_i x_j = x_j x_i$ for every possible pair i,j. So the number of equations increases faster than the number of distinct products $x_i x_j \ldots x_k$. Therefore, at some point the total number of linearly independent equations could exceed the number of distinct products, and the system of equations could be solved, at least in principle.

To illustrate extended linearization, consider the case where b=c=20, d=e=2, and the ring is ordinary arithmetic modulo p=7159. ($7159^{20}$ is about $1.08 \times 2^{256}$.) There would be $20^2 = 400$ distinct scalars in each matrix in the F and G families. The commutativity condition provides 20(20−2)=360 linearly independent equations for each set of variables. This reduces the number of unknowns to 40 for the F family and 40 for the G family. The eavesdropper knows the values of the matrices X=SMT and Y=RSMTQ. This gives 400 quadratic equations in the 80 unknowns, 40 from R and 40 from Q. These 400 equations contain 1600 distinct products.

Since these equations have a homogeneous structure, a shortcut can be taken to simplify the extended linearization. It is only necessary to multiply these equations by products of the form $x_i y_j$ where $x_i$ is one of the 40 unknowns from R and $y_j$ is one of the 40 unknowns from Q. There are 1600 such products, so this gives 640,000 additional equations for a total of 640,400 equations. The number of distinct products occurring in these equations is 1600 quadratic terms and $(40 \cdot 41/2)^2 = 672,400$ quartic terms for a total of 674,000 products. If the 640,400 equations were all linearly independent, then it would be possible to solve these equations on today's high-end supercomputers using sparse-matrix techniques, plus a simple trick. The trick is to try all possible values for one of the variables in R and one in Q. This is called partial enumeration. Since p=7159, this means that the set of 640,400 equations would need to be solved $p^2=51,251,281$ times. When one variable in each set of 40 is known the number of unknown products becomes $39^2+(39\cdot40/2)^2=609,921$.

The 640,400 equations will produce many solutions, perhaps billions of solutions, for the 609,921 unknown products. Most of these solutions will be inconsistent, that is, there will not be any set of values for the original 78 unknown scalars which can produce those product values. All of these sets of solutions for the 609,921 products will have to be winnowed down to a relative handful that will result in R and Q matrices which will produce the known value of Y=RSMTQ from the known value of X=SMT.

To complete this numerical example, suppose that solving n equations in n unknowns for large sparse matrices takes about $n^{2.5}$ elementary operations. Doing this $p^2$ times with p=7159 and n=640,400 takes about $1.7\times10^{22}$ or about $2^{74}$ elementary operations. This is much less than $2^{128}$, but it is still a daunting task. Recall that this must be done for every block of every message, and that it depends on the set of 640,400 equations containing at least 609,921 linearly independent equations, that is, having a rank of at least 609,921, which might not ever happen. So this might be an adequate level of security for some applications.

In high security cryptography caution and care are the watchwords. There are three modifications that can be used to improve the security. (1) Increase the size of the matrices. (2) Use matrices for which d and e are 3 rather than 2. (3) Use matrices over a ring which is not commutative. The pros and cons of these 3 solutions will now be discussed.

Increasing the size of the matrices is a speed-versus-security trade-off. If the matrices were increased from 20×20 to 30×30 the encryption time would increase in the ratio 27:8 or roughly by a factor of 3.4. The security would increase by a larger factor. There would be 900 equations in 120 unknowns, with 3600 distinct products. Extended linearization would expand this to 3,240,900 equations in 3,352,500 unknowns. If these 3,240,900 equations were nearly all linearly independent, then this system of equations also could be solved by enumerating just two of the 120 unknown variables. This looks formidable, but the matrices are very sparse, with at most 3601 entries on any row, so the storage needed is still within the range of today's supercomputers. The number of elementary operations would be on the order of $10^{24}$ or $2^{80}$. This is an improvement of about a factor of 60 over the security for the 20×20 matrices, but still far short of the desired $2^{128}$ security level. Of course, this assumes that the 3,240,900 equations are almost all linearly independent, which is unlikely.

Increasing d and e from 2 to 3, but still using 20×20 matrices would require increasing p from 7159 to 602257 or larger. Since $p^2$ would be greater than $2^{31}$ this might not be feasible for certain types of hardware, and larger matrices with smaller values of p would be necessary. With b=c=20 and d=e=3 there would be 60 unknown scalars in each of the R and S matrices. This would make 400 equations with 120 unknowns, and 3600 distinct pairwise products. In this case it would not be adequate to multiply by pairs $x_iy_j$ from R and Q. That would result in 1,440,400 equations in 3,352,500 unknowns. It would be necessary to multiply these 1,440,400 equations in turn by all of the pairs $x_iy_j$ giving an additional 5,184,000,000 equations, with an additional 1,430,352,400 unknowns. This is solvable in theory, but it is questionable whether any computer now existing or available in the near future could possibly handle such an enormous problem.

Using a non-commutative ring may be the best solution. With a non-commutative ring it cannot be assumed that $x_ix_j=x_jx_i$ for any pair of unknowns, so extended linearization cannot be used at all. There are two drawbacks to using non-commutative rings. (1) The calculation for the sum and product of two ring elements may take longer, or, if the sum and product are calculated by using tables, the size of the ring will be limited by storage. (2) The size of the largest family of n×n matrices over a non-commutative ring with r elements often will be smaller than the corresponding size for n×n matrices over a commutative ring with r elements. Both of these factors mean that larger matrices will be needed.

To summarize, there are 3 methods available to defeat extended linearization, but all 3 methods require using larger matrices for a given size of ring, resulting in slower encryption and decryption.

It might be thought that the F family of matrices and the G family of matrices could have just $2^{64}$ members each, since that would make a total of $2^{128}$ matrix pairs. This would not be secure. If the eavesdropper enumerated all of the matrices on one side, that would result in a set of linear equations that could be solved easily. Therefore it is essential that all of the matrix families contain at least $2^{128}$ matrices.

For the same reason the two families F and G must be distinct. If the same commutative family were used on both sides, then there would still be $b^2$ quadratic equations, but the number of unknown scalars would be reduced from 2bd to bd, and the number of distinct pairs of unknown scalars would be reduced from $b^2d^2$ down to bd(bd+1)/2. This means that to get the same level of security, the size of the matrices would have to be increased by a factor of $\sqrt{2}$, which would slow encryption and decryption by a factor of about 2.83.

It is also worthwhile noting that Sender and Receiver must divide the message into blocks and units exactly the same way, so the sequence of block sizes, or the mathematical algorithm for choosing the block sizes, could be built into the encryption device or software. Otherwise, the sequence of block sizes would become an additional message key, which would need to be transmitted from Sender to Receiver, defeating the purpose of this invention. Therefore it does not improve the security of the encryption to vary the sizes of the blocks and units. Using variable block or unit sizes (which means either using several different rings, or using different conversions from message characters to ring scalars and back) could be done, and would fall within the scope of this disclosure, but it adds complexity without materially improving security, and may decrease the speed and increase the storage requirements.

It might be desirable in the two-sided method, however, to use some larger blocks when the message is not an even number of blocks. A numerical example might help illustrate this point. Suppose that the key matrices and message blocks are all 20×20, and that the message consists of 10,050 units. If the only block size available were 20×20, then the message would be 25.125 blocks long. Since matrix multiplication cannot be performed with fractional blocks, the message would have to be divided into 26 blocks, and it would be necessary to add 350 null units to the message. This increases the length of the 3 transmitted messages to 10,400 units each.

If more than one block size were allowed, but all of the message blocks had to be square matrices 20×20 or larger, then 2 blocks of the message could be made 21×21. This makes the total message length 10,082 units, requiring only 32 null units. The trade-off is that the encryption device would need to have the capability to generate both 20×20 matrices and 21×21 matrices, which would roughly double the amount of storage required for generating the key matrices and their inverses. That is, there would need to be 4 commutative families, F(20), F(21), G(20) and G(21) instead of just 2 families.

To take this example further, suppose the message blocks were not required to be square, but still needed to be at least 20×20 for security. Using just 3 commutative families F(20), G(20) and G(21) would make it possible to use 22 blocks of size 20×20 and 3 blocks of size 20×21 for a total message length of 10,060 units, which requires only 10 nulls. By using 4 commutative families, F(20), F(21), G(20) and G(21) the message could be divided into 12 blocks of 20×20, 2 blocks of 20×21 and 10 blocks of 21×21, so the message length would be exactly 10,050 units and no nulls would be needed.

The trade-off between needing more null units per message versus having more commutative families of matrices would be based on the expected distribution of message lengths and the cost of transmitting encrypted messages that were longer than the plaintext message. It should be emphasized, though, that using a smaller size for the last block of the message would make that block vulnerable to the eavesdropper. It is also considered poor practice to put all of the null characters in the last block. It is safest to distribute the nulls throughout the message.

Three different types of matrix multiplication will now be considered in greater detail: (1) where the matrix operations are performed bitwise on the units, scalar multiplication is bitwise logical-and, while scalar addition is bitwise exclusive-or; (2) where matrix operations are performed on units treated as integers modulo $2^u$, with scalar addition and multiplication performed modulo $2^u$; and (3) where matrix operations are performed on units treated as integers modulo some prime number p. For brevity, these 3 types of matrix multiplication may be called bitwise, mod-$2^u$ and mod-p. Other types of matrix multiplication are known, and the scope of this disclosure is deemed to cover all types of matrix multiplication, that is, to cover matrices over any ring.

Each type of matrix multiplication can be considered a separate embodiment of the disclosure. More exactly, each choice of ring, each choice of left-multiplication, right-multiplication or two-sided multiplication, and each set of commutative families of square matrices over that ring, gives one embodiment of this invention.

For bitwise matrix multiplication the largest possible commutative family of n×n matrices has $2^n$ members. If the standard of security is that the family must have at least $2^{128}$ members, then the matrices must be at least 128×128. In an earlier discussion it was shown that the families cannot have maximal size, and that the matrices must be two or three times as large, namely 256×256 or 384×384. This is still practical for one-sided matrix multiplication, but for two-sided multiplication it would make the message blocks 65,536 or 147,456 units, which could be as large as 589,824 characters. That might still be faster than the Shamir or NK-Crypt methods, but the large block size makes it practical only for bulk transmission of large data files such as digital movies.

Bitwise exclusive-or is exactly equivalent to addition modulo 2, and bitwise logical-and is the same as multiplication modulo 2, so the bitwise embodiment is the same as matrix multiplication modulo 2 carried out on all of the bits in each unit in parallel. In other words, the bitwise embodiment is simply matrix multiplication modulo 2 implemented using parallel bit operations to achieve greater speed.

Next we consider mod-$2^i$ matrix multiplication. Performing arithmetic modulo $2^u$ has the advantage that the modulo division can be performed by a fast logical-and computer operation instead of a slow computer division operation, or an even slower division-multiplication-subtraction combination. The security situation is exactly the same as the bitwise embodiment. The largest commutative families of n×n matrices still have $2^n$ members, and the same considerations show that the encryption matrices must also be 256×256 or 384×384. On small computers multiplication tends to be slower than bitwise exclusive-or and bitwise logical-and, so this method would be even slower than the bitwise embodiment. So both the bitwise and the mod-$2^u$ embodiments of the invention have limited practical use when doing two-sided multiplication (but nonetheless are covered by this disclosure).

We finally examine modulo p matrix multiplication. Here the units of the message are treated as integers modulo p, the scalars in the key matrices are integers modulo p, and the matrix scalar operations are multiplication and addition modulo p, where p is some prime number. One natural choice for p would be 257, which would eliminate the conversion step from characters to ring elements. Larger values of p allow the matrices to be smaller, so that the encryption will be faster. A first cut would be to choose p such that $p^2$ fits within one machine word. Larger values of p would require the scalar multiplication and modulo division to be simulated, which would slow the encryption. For example, if one machine word can handle a 31-bit integer, then p=46337 might be a good choice. If the machine word can hold 32-bit unsigned integers, then p=65521 could be a good choice. There are valid reasons for making other choices of p, and they are all considered within the scope of this disclosure.

The diagonal n×n matrices form a commutative family of $p^n$ matrices, of which $(p-1)^n$ are invertible. However, using diagonal matrices does not produce a secure encryption. In fact, using one-sided multiplication by diagonal matrices is equivalent to the Bisi method. Excluding families containing solely diagonal matrices, the largest possible size for a commutative family of n×n invertible matrices modulo p is $p^n-1$. Suppose that the number of key matrices must be at least $2^{128}$. For integers modulo 257 this means the key matrices must be at least 16×16, and for integers modulo 17 it means the key matrices must be at least 32×32. Even though the scalar operations modulo p will be slower than bitwise scalar operations or scalar operations modulo $2^u$, matrix multiplication modulo p produces much faster encryption and decryption on all hardware because the matrices are much smaller.

As discussed earlier, using commutative families of maximum size makes the encryption vulnerable. Therefore the commutative families should be chosen of smaller size, which requires the matrices to be 32×32 or 48×48 for p=257 and 64×64 or 96×96 for p=17. For p=46337 the matrices can be as small as 17×17 or 25×25.

One drawback to using a prime p modulus instead of a power of 2 is that a conversion from characters to units (ring elements) is required. If each unit is represented by u bits, the simplest form of conversion is to take every u−1 bits of the message, and treat that as one unit. This makes the encrypted messages larger than the plaintext message by a factor of u/(u−1). For some applications this expansion won't matter. However, if message expansion is a drawback, there are mathematical techniques which allow the units to be packed using only slightly more than $\log_2 p$ bits per unit. (See Frank Rubin, "Arithmetic Stream Coding Using Fixed Precision Registers" IEEE Trans. on Info. Theory 25 (November 1979), pp 672-675.) For 4-bit units this means the encrypted messages can be packed using $\log_2 17=4.0875$ bits per unit instead of 5 bits, and for 8-bit units the encrypted messages need $\log_2 257 = 8.0056$ bits per unit instead of 9 bits. The increase in message length from 8 bits to 8.0056 bits per unit should be considered minor.

There are just two more points which need to be addressed to complete the assessment of the security of the mod-p method of matrix multiplication. These points are information leakage, and short message blocks. Information leakage occurs when a message block consists of all zeroes. In that case, the corresponding block in all 3 transmitted messages will be all zero, and conversely a block in a transmitted message which is all zero means that the plaintext block is all zero. This allows the eavesdropper to know the contents of that message block without any knowledge of the keys. This situation is called information leakage. Remarkably, there is a single solution which solves both problems.

Most messages will not divide evenly into blocks of bc units. There is usually a shorter block remaining at the end of the message. There are several standard methods used in cryptography to deal with this problem. One method was described earlier, namely providing several commutative families of matrices, and using several different block sizes. This will suffice when all of the messages are very long. Unless all of the available block lengths are multiples of some common divisor, it is always possible to find a combination of block lengths which exactly equal the message length, when the message is long enough.

However, if some of the messages can be short, and particularly if some of the messages can be shorter than the smallest block size, then some other method of handling short blocks is needed. The simplest method is to pad the message with null characters, which are stripped off after the message is decrypted. The value 0 is often used as the null. This will not cause problems if the unit value 0 never occurs in the plaintext. For example the unit value 0 does not occur in text represented in ASCII code or EBCDIC code. However, the unit value 0 can occur in binary data. In that case discarding zeroes could cause some valid data to be lost, and it also could lead to information leakage by causing all-zero blocks that were a combination of 0-data and 0-nulls. So 0 cannot be used as a null in a general-purpose setting. The best alternative would be to use p−1 as the null character.

If 1 is added to every message unit, this eliminates data units which are 0, and thus prevents the information leakage. That leaves 0 available for use as the null character. Using 0 as a null can simplify the packing and unpacking of the blocks. So this expedient conveniently solves both problems.

It has already been noted that the null characters need not be appended to the end of the message, but may be distributed throughout the message. This is considered good practice in cryptography since that prevents an eavesdropper from exploiting the known locations of the null characters to solve the last block of the message, and thus obtain some of the key matrices.

To recap, information leakage can be minimized by first converting the message into units which are integers in the range 0 to p−2, then adding 1 to each unit, and using 0 as the null value for padding the message.

Another form of matrix multiplication is matrix multiplication using Gaussian integers. This will be described, but without a detailed analysis of its security. A Gaussian integer is a number of the form a+bi where a and b are integers, and i represents the imaginary square root of −1. Two Gaussian integers are added as $(a+bi)+(c+di)=(a+c)+(b+d)i$ and are multiplied as $(a+bi)(c+di)=(ac-bd)+(ad+bc)i$. Notice that one Gaussian multiplication requires 4 integer multiplications. For encryption, the integer addition and multiplication could be done either bitwise, modulo $2^u$, or modulo a prime p.

That is all 3 forms of matrix multiplication considered above can be done with Gaussian integers in place of integers. (Hence a full security analysis would require 3 separate analyses, as elaborated above.) When using Gaussian integer arithmetic, the message would be treated as pairs of units (a,b) representing the Gaussian integer a+bi, and the scalars in the matrices would be similar pairs. A message block of size b×c would contain bc pairs of units, hence 2bc units, and each encryption of decryption matrix would also contain bc Gaussian integers represented as 2bc units.

The use of Gaussian integers could result in a significant speed improvement if the matrices can be reduced to half the size needed for the modulo-p embodiment. This is because matrix multiplication takes on the order of $b^3$ operations. Cutting the matrix size in half would therefore require only ⅛ as many ring unit operations, each taking 4 times the number of elementary arithmetic operations. The net result is that the Gaussian embodiment would take ½ the number of elementary operations. Similarly, the Gaussian embodiment would require only ½ the storage.

Another ring which is important in cryptography is $GF(p^n)$, the Galois field of order $p^n$ which has been mentioned earlier. Elements of $GF(p^n)$ can be considered as polynomials f(x) in one variable whose order is n−1 and whose coefficients are integers modulo p. These polynomials are themselves reduced modulo some given irreducible polynomial, that is, a polynomial which is not the product of two polynomials of lower order. For example, the polynomial $x^2+1$ is irreducible modulo 3, but $x^2+2$ is reducible modulo 3 since $x^2+2=(x+1)(x+2)$. The polynomial $x^3+2x+1$ reduces to x+1 modulo $x^2+1$ because $x^3+2x+1=x(x^2+1)+(x+1)$. When $p^n$ is small, addition and multiplication in the ring $GF(p^n)$ can be done by simple table look-up. When $p^n$ is large, addition and multiplication in $GF(p^n)$ can be done in software by a subroutine, or in hardware by a special chip. In either case, it becomes a trade-off whether a smaller matrix size, but slower scalar operations, produces a faster encryption than using other rings.

Earlier, five goals were listed for the encryption method. Let us turn next to the fourth goal, speed. For each block of the message, four encryption and four decryption matrices must be chosen, and the message block must be multiplied by each of them in turn. Multiplying two n×n matrices takes on the order of $n^3$ elementary operations. (There are faster methods available which are useful when n is large.) More precisely, encryption and decryption will take $8n^3$ modulo multiplications, and $8n^2(n-1)$ modulo additions. In the mod-p embodiment, if the size of the units is kept small enough so that each sum $A_{i1}B_{1j}+A_{i2}B_{2j}+\ldots+A_{in}B_{nj}$ fits within one binary computer word, then a single modulo reduction can be made after each sum is calculated, rather than after each multiplication. That reduces the work to $8n^3$ multiplications, $8n^2(n-1)$ additions, and $8n^2$ modulus divisions for each block of the message.

This is a good reason to choose a somewhat smaller value of p, namely a value for which $np^2$ fits within one machine word. Again, this is a trade-off. A smaller value of p requires a larger value of n to maintain the required level of security. If modulo division is a slow operation compared to multiplication and addition, then the trade-off may be beneficial. If modulo division takes about the same time as multiplication, then using larger p and smaller matrices will give the best speed.

Encryption and decryption of a message requires 8 matrix multiplications. It also requires choosing 2 encryption matrices and 2 inverse matrices for decryption using one-sided multiplication, or 4 encryption matrices and 4 inverse matrices for decryption for two-sided multiplication. If generating an encryption matrix is a slow operation, then the entire message exchange will be slow. Therefore, for this invention to be practical, there must be a fast method for choosing the encryption and decryption matrices.

The following method for choosing encryption and decryption matrices requires only one matrix multiplication to generate each matrix.

Assume that a number of members of each of the commutative families of matrices have been precomputed and stored in tables internal to the encryption device, or on an external medium available to the encryption device, along with their inverse matrices. Call these seed matrices $E_1, E_2, \ldots, E_H$ and their inverses $E_1', E_2', \ldots, E_H'$. For the two-sided method there will be one set of seed matrices for each left-side family $F(b)$ and another set for each right-side family $G(c)$.

At the start of each encryption run, for each seed matrix $E_i$ randomly choose a second seed matrix $E_j$ with $i \neq j$, and replace $E_i$ by the matrix product $E_i E_j$. This randomization pass should be repeated k times until $(H-1)^{kH} > 2^{128}$. For example, if $H=111$, then 4 passes are needed, but for $H=13$ only 3 passes are required. (It is wise to make $(H-1)^{kH}$ considerably larger than $2^{128}$ because different sequences of random choices may result in the same final set of matrices.) At this point the two sets of seed matrices will be sufficiently random.

Once these setup steps have been performed, to generate an encryption matrix choose two seed matrices $E_i$ and $E_j$ with $i \neq j$. Use the matrix product $E_i E_j$ as the encryption matrix, and then replace the seed matrix $E_i$ by $E_i E_j$. This generates the encryption matrix using just one matrix multiplication.

For decryption, the same sequence of steps will be performed on the inverses of the seed matrices. That is, $E_i'$ would be replaced by $E_i' E_j'$ for the same values of i and j. It is not necessary to save the entire sequences of encryption or decryption matrices; it is sufficient to save the sequence of choices i and j. The random choices for i and j could be generated by a suitable pseudo-random number generator. Pseudo-random number generators are well-known in the art, and will not be explained further, except for one important aspect. It is essential that the generator has enough internal states so that trying all possible internal states is infeasible. That is, the generator must have at least $2^{128}$ non-equivalent internal states. The initial internal state could be saved instead of the i and j sequence in order to save space.

Each matrix multiplication requires $n^3$ multiplications, $n^2(n-1)$ additions and either $n^2$ or $n^3$ modulus divisions. Assume the worst case, namely $n^3$ modulus divisions.

In the one-sided method, for every b-unit block of the message there are 4 matrix-vector multiplications for encryption and decryption, and 4 matrix multiplications to generate the encryption and decryption key matrices. The total number of operations per block, including key generation, encryption and decryption is $4b^3 + 4b^2$ ring multiplications and $4b^2(b-1) + 4b(b-1)$ ring additions. Roughly, then, there are about $4b^2$ multiplications and $4b^2$ ring additions per unit of the message.

This is faster than the Shamir or NK-Crypt methods for smaller values of b, say b<100, and perhaps 100 times as fast when b is as small as 10.

In the two-sided method for every b×c block of the message there are 8 matrix multiplications for encryption and decryption, and 8 matrix multiplications to generate the encryption and decryption key matrices. The total number of operations per block, including key generation, encryption and decryption is $8b^3 + 8c^3$ multiplications, $8b^2(b-1) + 8c^2(c-1)$ additions, and either $8b^2 + 8c^2$ or $8b^3 + 8c^3$ modulus divisions. If b and c are close in value, then the total number of elementary ring operations for each unit of the message is $8b + 8c$ multiplications, $8(b-1) + 8(c-1)$ additions and either 16 or $8b + 8c$ modulus divisions.

This is thousands of times as fast as the Shamir method or NK-Crypt method, and hundreds of times as fast as the Massey-Omura method.

The encryption methods in this disclosure are improvements over the Bisi and keylilla encryption methods because they achieve a much higher level of security. They obtain this higher security because the encryption function results in an intractable set of quadratic equations over the ring.

A set of linear equations over a ring can be solved by standard linear algebra methods such as Gaussian reduction. A set of quadratic equations over a commutative ring can be solved by a combination of partial enumeration, extended linearization and linear algebra. A set of quadratic equations over a non-commutative ring can be solved by a combination of partial enumeration and linear algebra. In both cases, the commutative families of matrices can be chosen so that the resulting the quadratic equations are intractable.

Bisi and keylilla, by contrast, employ multiplication and exclusive-or for encoding. These are easily reversed using division and exclusive-or, respectively. If the eavesdropper obtains all 3 transmitted messages, it is simple to recover the plaintext.

Two extended examples will be given to illustrate how the one-sided and two-sided encryption methods work. Consider the one-sided method first, and let the message be SECRET. The encryption and decryption key matrices will be 2×2 matrices over the ring of integers modulo 29. This is the smallest prime greater than 26, which is the number of letters in the English alphabet.

The message SECRET will be represented as 19 5 3 18 5 20 since S is the $19^{th}$ letter of the alphabet, E is the $5^{th}$ letter, C is the $3^{rd}$ letter, R is the $18^{th}$ letter, E is the $5^{th}$ letter and T is the $20^{th}$ letter. Suppose that the sender chooses the encryption matrices:

$$S1 = \begin{pmatrix} 2 & 2 \\ 4 & 6 \end{pmatrix} S2 = \begin{pmatrix} 4 & 6 \\ 12 & 16 \end{pmatrix} S3 = \begin{pmatrix} 1 & 4 \\ 8 & 9 \end{pmatrix}$$

as the encryption keys.

The inverses of these matrices are:

$$S1' = \begin{pmatrix} 16 & 14 \\ 28 & 15 \end{pmatrix} S2' = \begin{pmatrix} 27 & 8 \\ 16 & 14 \end{pmatrix} S3' = \begin{pmatrix} 16 & 9 \\ 15 & 9 \end{pmatrix}$$

These inverse matrices will be the sender's decryption keys. It is easy to verify that $S_1$ and $S_1'$ are inverse matrices by multiplying them modulo 29:

$$\begin{pmatrix} 2 & 2 \\ 4 & 6 \end{pmatrix} \times \begin{pmatrix} 16 & 14 \\ 28 & 15 \end{pmatrix} = \begin{pmatrix} 2 \times 16 + 2 \times 28 & 2 \times 14 + 2 \times 15 \\ 4 \times 16 + 6 \times 28 & 4 \times 14 + 6 \times 15 \end{pmatrix} = \begin{pmatrix} 88 & 58 \\ 232 & 146 \end{pmatrix} = \begin{pmatrix} 1 & 0 \\ 0 & 1 \end{pmatrix} \mod 29$$

In the same way it can be verified that the key matrices commute.

Since the message SECRET=19 5 3 18 5 20 contains 6 characters, or units, it will be broken into 3 blocks of 2 units each, namely (19,5) (3,18) (5,20). When these message blocks are left-multiplied by the sender's encryption matrices $S_1, S_2, S_3$ the resulting encrypted message SM is (19, 19) (4,5) (17,17). It is easy the verify this. For example the first block of the message (19,5) would be encrypted as:

$$\begin{pmatrix} 2 & 2 \\ 4 & 6 \end{pmatrix} \times \begin{pmatrix} 19 \\ 5 \end{pmatrix} = \begin{pmatrix} 2 \times 19 + 2 \times 5 \\ 4 \times 19 + 6 \times 5 \end{pmatrix} = \begin{pmatrix} 48 \\ 106 \end{pmatrix} = \begin{pmatrix} 19 \\ 19 \end{pmatrix} \mod 29$$

So the first block of SM would be (19,19). The other blocks are encrypted the same way by the key matrices $S_2$ and $S_3$. The encrypted message SM=(19,19) (4,5) (27,17) is sent to the receiver.

Suppose that the receiver chooses the encryption matrices:

$$R1 = \begin{pmatrix} 18 & 26 \\ 23 & 12 \end{pmatrix} R2 = \begin{pmatrix} 23 & 26 \\ 23 & 17 \end{pmatrix} R3 = \begin{pmatrix} 25 & 25 \\ 21 & 17 \end{pmatrix}$$

The inverses of these matrices are $$R1' = \begin{pmatrix} 15 & 11 \\ 22 & 8 \end{pmatrix} R2' = \begin{pmatrix} 3 & 21 \\ 13 & 16 \end{pmatrix} R3' = \begin{pmatrix} 21 & 22 \\ 15 & 7 \end{pmatrix}$$

These matrices will be the receiver's decryption keys. It is easy to verify that these are the inverse matrices, as above. The receiver encrypts the message SM by left-multiplying with the key matrices $R_1, R_2, R_3$ to get RSM=(24,27) (19,3) (27,15) as illustrated before. The encrypted message RSM is sent back to the sender.

The sender will decrypt the message RSM=(24,27) (19,3) (27,15) by left-multiplying with the decryption matrices $S_1'$, $S_2'$, $S_3'$ as shown before. The resulting message will be RM= (8,4) (15,27) (16,10), which is now encrypted only with the receiver's keys. This message RM will be sent back to the receiver.

The receiver will decrypt the message RM=(8,4) (15,27) (16,10) using the decryption matrices $R_1', R_2', R_3'$ as already illustrated. The result will be M=(19,5) (3,18) (5,20). This is the original message.

$$M = 19 \quad 5 \quad 3 \quad 18 \quad 5 \quad 20$$
$$S \quad E \quad C \quad R \quad E \quad T$$

The receiver has obtained the original message without any knowledge of the sender's secret key. Conversely, the sender has never had any knowledge of the receiver's key.

The second example will illustrate how the two-sided matrix encryption and decryption works. The message will be the word WORD. This is represented as 23 15 18 4 since W is the 23$^{rd}$ letter of the alphabet, O is the 15$^{th}$ letter, R is the 18$^{th}$ letter, and D is the 4$^{th}$ letter. The message is formed into a message block, which is a 2×2 matrix:

$$M = \begin{pmatrix} 23 & 15 \\ 18 & 4 \end{pmatrix}$$

The message M consists of the single message block $M_1$ shown above.

The matrices will be taken modulo the prime p=29 since this is the smallest prime greater than 26, which is the number of letters in the alphabet. Such small matrices with such a small prime would not be secure. The example is provided only to show the mechanics of the encryption and decryption process.

Suppose that the sender chooses the encryption matrices S and T as follows:

$$S = \begin{pmatrix} 1 & 4 \\ 8 & 9 \end{pmatrix} T = \begin{pmatrix} 2 & 3 \\ 6 & 11 \end{pmatrix}$$

The inverses of these matrices are S' and T':

$$S' = \begin{pmatrix} 16 & 9 \\ 18 & 5 \end{pmatrix} T' = \begin{pmatrix} 10 & 21 \\ 13 & 15 \end{pmatrix}$$

It is straightforward to verify that SS'=TT'=I, where I is a 2×2 identity matrix. These will be the sender's decryption matrices.

The sender encrypts the message M by left-multiplying with S and right multiplying with T as follows:

$$S \times M \times T = \begin{pmatrix} 1 & 4 \\ 8 & 9 \end{pmatrix} \times \begin{pmatrix} 23 & 15 \\ 18 & 4 \end{pmatrix} \times \begin{pmatrix} 2 & 3 \\ 6 & 11 \end{pmatrix} = SMT = \begin{pmatrix} 28 & 17 \\ 4 & 28 \end{pmatrix} \mod 29$$

This produces the first encrypted message SMT which is sent to the receiver. The receiver superencrypts this message by left-multiplying it with R and right-multiplying it with Q. Suppose the receiver has chosen the following matrices for R and Q, and their inverse matrices R' and Q':

$$R = \begin{pmatrix} 9 & 2 \\ 4 & 13 \end{pmatrix} R' = \begin{pmatrix} 23 & 21 \\ 13 & 7 \end{pmatrix} Q = \begin{pmatrix} 3 & 16 \\ 3 & 22 \end{pmatrix} Q' = \begin{pmatrix} 27 & 12 \\ 24 & 5 \end{pmatrix}$$

It can easily be verified that R commutes with S and that Q commutes with T. That is, R and S have been taken from one commutative family F, and Q and T have been taken from another commutative family G. The receiver encrypts SMT with R and Q to produce RSMTQ as follows:

$$R \times SMT \times Q = \begin{pmatrix} 9 & 2 \\ 4 & 13 \end{pmatrix} \times \begin{pmatrix} 28 & 17 \\ 4 & 28 \end{pmatrix} \times \begin{pmatrix} 3 & 16 \\ 3 & 22 \end{pmatrix} = RSMTQ = \begin{pmatrix} 15 & 0 \\ 19 & 6 \end{pmatrix} \mod 29$$

This produces the second encrypted message RSMTQ which is sent back to the sender. The sender decrypts this message by left-multiplying it with S' and right-multiplying it with T' as follows:

$$S' \times RSMTQ \times T' =$$

$$\begin{pmatrix} 16 & 9 \\ 18 & 5 \end{pmatrix} \times \begin{pmatrix} 15 & 0 \\ 19 & 6 \end{pmatrix} \times \begin{pmatrix} 10 & 21 \\ 13 & 15 \end{pmatrix} = RMQ = \begin{pmatrix} 27 & 16 \\ 9 & 24 \end{pmatrix} \bmod 29$$

Since the matrices commute, S'RSMTQT'=RMQ. This third encrypted message is sent to the receiver. The receiver decrypts this message by left-multiplying it with R' and right-multiplying it with Q' as follows:

$$R' \times RMQ \times Q' =$$

$$\begin{pmatrix} 23 & 21 \\ 13 & 7 \end{pmatrix} \times \begin{pmatrix} 27 & 16 \\ 9 & 24 \end{pmatrix} \times \begin{pmatrix} 27 & 12 \\ 24 & 5 \end{pmatrix} = M = \begin{pmatrix} 23 & 15 \\ 18 & 4 \end{pmatrix} \bmod 29$$

This is the original message. Recall that 23 represents W, 15 stands for O, 18 represents R and 4 means D. Thus the receiver has obtained the original plaintext message, WORD.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention. In particular, the appended claims are intended to include matrix multiplication over any ring, using any commutative families of matrices, using any method of randomly selecting matrices from those commutative families, and using any method for converting from message characters to ring elements and back.

I claim:

1. An encryption and decryption method for enabling secure communication from a sending party to a receiving party of a message M, using sending party and receiving party computerized devices comprising means for storing and processing data, comprising:

the sending party breaking said message into k message blocks $M_1, M_2, \ldots, M_k$ to be encrypted wherein said k message blocks $M_i$, for $1 \leq i \leq k$, may be, but are not necessarily, the same size, wherein each message block is treated as a matrix of size $b_i \times c_i$ over a non-commutative ring, and wherein each scalar element of said message block matrix is a numerical representation of an element of said ring;

establishing for each distinct message block size $b_i$ and $c_i$ corresponding non-maximal commutative families $F(b_i)$ of left-invertible square matrices and $G(c_i)$ of right-invertible square matrices of sizes $b_i \times b_i$ and $c_i \times c_i$ over said ring, wherein each scalar element of each such matrix is a numerical representation of an element of said ring;

the sending party choosing as sending party encryption keys, $S_i$ a matrix chosen from said commutative family $F(b_i)$ of left-invertible square matrices, and $T_i$ a matrix chosen from said commutative family $G(c_i)$ of right-invertible square matrices, for encrypting said message block $M_i$;

establishing sending party decryption keys $S_i'$ being a left inverse matrix of $S_i$, such that $S_i'S_i$ is the identity matrix, and $T_i'$ being a right inverse matrix of $T_i$, such that $T_iT_i'$ is the identity matrix;

the receiving party independently choosing as receiving party encryption keys, $R_i$ a matrix chosen from said commutative family $F(b_i)$ of left-invertible square matrices, and $Q_i$ a matrix chosen from said commutative family $G(c_i)$ of right-invertible square matrices, for encrypting said message block $M_i$;

establishing receiving party decryption keys $R_i'$ being a left inverse matrix of $R_i$, such that $R_i'R_i$ is the identity matrix, and $Q_i'$ being a right inverse matrix of $Q_i$, such that $Q_iQ_i'$ is the identity matrix;

the sending party matrix multiplying one or more of the message blocks $M_i$ of M with its corresponding encryption matrices $S_i$ and $T_i$ to produce a first encrypted message block $S_iM_iT_i$;

the sending party electronically transmitting a message containing said encrypted message block $S_iM_iT_i$ to the receiving party;

the receiving party receiving and matrix multiplying said encrypted message block $S_iM_iT_i$ with its corresponding encryption matrices $R_i$ and $Q_i$ to produce a second, superencrypted message block $R_iS_iM_iT_iQ_i$;

the receiving party electronically transmitting a message containing said superencrypted message block $R_iS_iM_iT_iQ_i$ to the sending party;

the sending party receiving and matrix multiplying said $R_iS_iM_iT_iQ_i$ with its corresponding decryption matrices $S_i'$ and $T_i'$ to produce a third encrypted message block $S_i'R_iS_iM_iT_iQ_iT_i'=R_iM_iQ_i$, where said $R_iM_iQ_i$ represents said message block $M_i$ encrypted solely using the receiving party's encryption keys $R_i$ and $Q_i$;

the sending party electronically transmitting a message containing said encrypted message block $R_iM_iQ_i$ to the receiving party; and the receiving party receiving and matrix multiplying said $R_iM_iQ_i$ with its corresponding decryption matrices $R_i'$ and $Q_i'$ to produce a decrypted message block $R_i'R_iM_iQ_iQ_i'=M_i$, that is, to produce the original message block $M_i$.

2. The method of claim 1, further comprising said computerized devices dividing said message into blocks of the same size.

3. The method of claim 1, further comprising said computerized devices dividing said message into blocks of different sizes.

4. The method of claim 1, further comprising said computerized devices encrypting an entirety of said message using matrix multiplication.

5. The method of claim 1, further comprising said computerized devices encrypting a portion of said message using matrix multiplication.

6. The method of claim 1, further comprising said computerized devices transmitting the entirety of said message M from the sending party to the receiving party.

7. The method of claim 1, further comprising said computerized devices transmitting a portion of said message M comprising at least one encrypted block, from the sending party to the receiving party.

8. The method of claim 1, further comprising said computerized devices starting from a fixed set of seed matrices for each of said commutative families of matrices, randomly selecting and then generating the matrix product of two of said seed matrices, using said matrix product as the encryption or decryption matrix for a block of said message, and also including said matrix product among said seed matrices for use in subsequently generating additional encryption matrices.

9. An encryption and decryption system for enabling secure communication from a sending party to a receiving party of a message M, comprising sending party and receiving party computerized devices comprising computerized storage and processing capacity for:

the sending party breaking said message into k message blocks $M_1, M_2, \ldots, M_k$ to be encrypted wherein said k message blocks $M_i$, for $1 \leq i \leq k$, may be, but are not necessarily, the same size, wherein each message block is treated as a matrix of size $b_i \times c_i$ over a non-commutative ring, and wherein each scalar element of said message block matrix is a numerical representation of an element of said ring;

establishing for each distinct message block size $b_i$ and $c_i$ corresponding non-maximal commutative families $F(b_i)$ of left-invertible square matrices and $G(c_i)$ of right-invertible square matrices of sizes $b_i \times b_i$ and $c_i \times c_i$ over said ring, wherein each scalar element of each such matrix is a numerical representation of an element of said ring;

the sending party choosing as sending party encryption keys, $S_i$ a matrix chosen from said commutative family $F(b_i)$ of left-invertible square matrices, and $T_i$ a matrix chosen from said commutative family $G(c_i)$ of right-invertible square matrices, for encrypting said message block $M_i$;

establishing sending party decryption keys $S_i'$ being a left inverse matrix of $S_i$, such that $S_i'S_i$ is the identity matrix, and $T_i'$ being a right inverse matrix of $T_i$, such that $T_iT_i'$ is the identity matrix;

the receiving party independently choosing as receiving party encryption keys, $R_i$ a matrix chosen from said commutative family $F(b_i)$ of left-invertible square matrices, and $Q_i$ a matrix chosen from said commutative family $G(c_i)$ of right-invertible square matrices, for encrypting said message block $M_i$;

establishing receiving party decryption keys $R_i'$ being the inverse matrix of $R_i$, such that $R_i'R_i$ is the identity matrix, and $Q_i'$ being the inverse matrix of $Q_i$, such that $Q_i'Q_i$ is the identity matrix;

the sending party matrix multiplying one or more of the message blocks $M_i$ of M with its corresponding key matrices $S_i$ and $T_i$ to produce a first encrypted message block $S_iM_iT_i$;

the sending party sending a message containing said encrypted message block $S_iM_iT_i$ to the receiving party;

the receiving party receiving and matrix multiplying said encrypted message block $S_iM_iT_i$ with its corresponding key matrices $R_i$ and $Q_i$ to produce a second, superencrypted message block $R_iS_iM_iT_iQ_i$;

the receiving party sending a message containing said superencrypted message block $R_iS_iM_iT_iQ_i$ to the sending party;

the sending party receiving and matrix multiplying said $R_iS_iM_iT_iQ_i$ with $S_i'$ and $T_i'$ to produce a third encrypted message block $S_i'R_iS_iM_iT_iQ_iT_i'=R_iM_iQ_i$, where said $R_iM_iQ_i$ represents said message block $M_i$ encrypted solely using the receiving party's encryption keys $R_i$ and $Q_i$;

the sending party sending a message containing said encrypted message block $R_iM_iQ_i$ to the receiving party; and the receiving party receiving and matrix multiplying said $R_iM_iQ_i$ with $R_i'$ and $Q_i'$ to produce a decrypted message block $R_i'R_iM_iQ_iQ_i'=M_i$, that is, to produce the original message block $M_i$.

10. The system of claim 9, said computerized devices further comprising computerized storage and processing capacity for dividing said message into blocks of the same size.

11. The system of claim 9, said computerized devices further comprising computerized storage and processing capacity for dividing said message into blocks of different sizes.

12. The system of claim 9, said computerized devices further comprising computerized storage and processing capacity for encrypting the entirety of said message using matrix multiplication.

13. The system of claim 9, said computerized devices further comprising computerized storage and processing capacity for encrypting a portion of said message using matrix multiplication.

14. The system of claim 9, said computerized devices further comprising computerized storage and processing capacity for transmitting the entirety of said message M from the sending party to the receiving party.

15. The system of claim 9, said computerized devices further comprising computerized storage and processing capacity for transmitting a portion of said message M comprising at least one encrypted block, from the sending party to the receiving party.

16. The system of claim 9, said computerized devices further comprising computerized storage and processing capacity for starting from a fixed set of seed matrices for each of said commutative families of matrices, randomly selecting and then generating the matrix product of two of said seed matrices, using said matrix product as the encryption or decryption matrix for a block of said message, and also including said matrix product among said seed matrices for use in subsequently generating additional encryption matrices.

17. A non-transitory machine-readable medium including instructions executable by a computer processor for enabling secure communication from a sending party to a receiving party of a message M, the machine-readable medium comprising one or more computerized instructions for:

the sending party breaking said message into k message blocks $M_1, M_2, \ldots, M_k$ to be encrypted wherein said k message blocks $M_i$, for $1 \leq i \leq k$, may be, but are not necessarily, the same size, wherein each message block is treated as a matrix of size $b_i \times c_i$ over a non-commutative ring, and wherein each scalar element of said message block matrix is a numerical representation of an element of said ring;

establishing for each distinct message block size $b_i$ and $c_i$ corresponding non-maximal commutative families $F(b_i)$ of left-invertible square matrices and $G(c_i)$ of right-invertible square matrices of sizes $b_i \times b_i$ and $c_i \times c_i$ over said ring, wherein each scalar element of each such matrix is a numerical representation of an element of said ring;

the sending party choosing as sending party encryption keys, $S_i$ a matrix chosen from said commutative family $F(b_i)$ of left-invertible square matrices, and $T_i$ a matrix chosen from said commutative family $G(c_i)$ of right-invertible square matrices, for encrypting said message block $M_i$;

establishing sending party decryption keys $S_i'$ being a left inverse matrix of $S_i$, such that $S_i'S_i$ is the identity matrix, and $T_i'$ being a right inverse matrix of $T_i$, such that $T_iT_i'$ is the identity matrix;

the receiving party independently choosing as receiving party encryption keys, $R_i$ a matrix chosen from said commutative family $F(b_i)$ of left-invertible square matrices, and $Q_i$ a matrix chosen from said commutative family $G(c_i)$ of right-invertible square matrices, for encrypting said message block $M_i$;

establishing receiving party decryption keys $R_i'$ being the inverse matrix of $R_i$, such that $R_i'R_i$ is the identity matrix, and $Q_i'$ being the inverse matrix of $Q_i$, such that $Q_i'Q_i$ is the identity matrix;

the sending party matrix multiplying one or more of the message blocks $M_i$ of M with its corresponding key matrices $S_i$ and $T_i$ to produce a first encrypted message block $S_iM_iT_i$;

the sending party sending a message containing said encrypted message block $S_iM_iT_i$ to the receiving party;

the receiving party receiving and matrix multiplying said encrypted message block $S_iM_iT_i$ with its corresponding key matrices $R_i$ and $Q_i$ to produce a second, superencrypted message block $R_iS_iM_iT_iQ_i$;

the receiving party sending a message containing said superencrypted message block $R_iS_iM_iT_iQ_i$ to the sending party;

the sending party receiving and matrix multiplying said $R_iS_iM_iT_iQ_i$ with $S_i'$ and $T_i'$ to produce a third encrypted message block $S_i'R_iS_iM_iT_iQ_iT_i'=R_iM_iQ_i$, where said $R_iM_iQ_i$ represents said message block $M_i$ encrypted solely using the receiving party's encryption keys $R_i$ and $Q_i$;

the sending party sending a message containing said encrypted message block $R_iM_iQ_i$ to the receiving party; and the receiving party receiving and matrix multiplying said $R_iM_iQ_i$ with $R_i'$ and $Q_i'$ to produce a decrypted message block $R_i'R_iM_iQ_iQ_i'=M_i$, that is, to produce the original message block $M_i$.

18. The machine-readable medium of claim 17, further comprising one or more computerized instructions for dividing said message into blocks of the same size.

19. The machine-readable medium of claim 17, further comprising one or more computerized instructions for dividing said message into blocks of different sizes.

20. The machine-readable medium of claim 17, said computerized devices further comprising computerized storage and processing capacity for encrypting the entirety of said message using matrix multiplication.

21. The machine-readable medium of claim 17, further comprising one or more computerized instructions for encrypting a portion of said message using matrix multiplication.

22. The machine-readable medium of claim 17, further comprising one or more computerized instructions for transmitting the entirety of said message M from the sending party to the receiving party.

23. The machine-readable medium of claim 17, further comprising one or more computerized instructions for transmitting a portion of said message M comprising at least one encrypted block, from the sending party to the receiving party.

24. The machine-readable medium of claim 17, further comprising one or more computerized instructions for starting from a fixed set of seed matrices for each of said commutative families of matrices, randomly selecting and then generating the matrix product of two of said seed matrices, using said matrix product as the encryption or decryption matrix for a block of said message, and also including said matrix product among said seed matrices for use in subsequently generating additional encryption matrices.

* * * * *